(12) United States Patent
Assawaworrarit et al.

(10) Patent No.: US 12,155,227 B2
(45) Date of Patent: Nov. 26, 2024

(54) SYSTEMS AND METHODS INVOLVING WIRELESS POWER TRANSFER USING AN AMPLIFIER WITH GAIN AND FEEDBACK

(71) Applicant: The Board of Trustees of the Leland Stanford Junior University, Stanford, CA (US)

(72) Inventors: Sid Assawaworrarit, Redwood City, CA (US); Shanhui Fan, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 162 days.

(21) Appl. No.: 17/771,296

(22) PCT Filed: Oct. 23, 2020

(86) PCT No.: PCT/US2020/057193
§ 371 (c)(1),
(2) Date: Apr. 22, 2022

(87) PCT Pub. No.: WO2021/081426
PCT Pub. Date: Apr. 29, 2021

(65) Prior Publication Data
US 2022/0385107 A1    Dec. 1, 2022

Related U.S. Application Data

(60) Provisional application No. 62/925,696, filed on Oct. 24, 2019.

(51) Int. Cl.
H02J 50/12    (2016.01)
H02J 50/05    (2016.01)
H02J 50/40    (2016.01)

(52) U.S. Cl.
CPC .............. H02J 50/12 (2016.02); H02J 50/05 (2016.02); H02J 50/40 (2016.02)

(58) Field of Classification Search
CPC ............. H02J 50/12; H02J 50/50; H02J 50/40
(Continued)

(56) References Cited

U.S. PATENT DOCUMENTS 9,276,545 B2    3/2016 Chan et al.
2017/0040846 A1*  2/2017 Sankar ..................... H04B 5/72
(Continued)

FOREIGN PATENT DOCUMENTS

EP    1236275 B1    6/2010

OTHER PUBLICATIONS

USPTO. International Search Report and Written Opinion dated Jan. 26, 2021, for parent PCT Application No. PCT/US2020/057193, 11 pages.
(Continued)

Primary Examiner — Michael R. Fin
(74) Attorney, Agent, or Firm — Crawford Maunu PLLC

(57) ABSTRACT

In certain examples, methods and semiconductor structures are directed to an apparatus including source circuitry configured to provide power to other circuitry, with the source circuitry including amplification circuitry (e.g., with a power-switching output) and a source resonator. The amplification circuitry is to provide power to the source resonator with a gain that is dependent on a coupling rate between the source circuitry and other external-receiving circuitry. The source circuitry is also to offset phase delay caused by the amplifier. In operation, the source resonator generates a magnetic field in response to the power, for highly-efficient wirelessly transfer of the power to the other circuitry.

24 Claims, 5 Drawing Sheets

(58) Field of Classification Search
USPC .......................................................... 307/104
See application file for complete search history.

(56) References Cited

U.S. PATENT DOCUMENTS

| | | |
|---|---|---|
| 2017/0126049 A1 | 5/2017 | Pan et al. |
| 2017/0126063 A1 | 5/2017 | Pan et al. |
| 2018/0241252 A1 | 8/2018 | Fan et al. |
| 2018/0269718 A1 | 9/2018 | Li et al. |

OTHER PUBLICATIONS

Y. Hou, M. Lin, W. Chen and X. Yang, Parity-time-symmetric Wireless Power Transfer System Using Switch-mode Nonlinear Gain Element, 2018 IEEE International Power Electronics and Application Conference and Exposition (PEAC), Shenzhen, China, 2018, pp. 1-5.

Zhou, Jiali et al. Nonlinear Parity-Time-Symmetric Model for Constant Efficiency Wireless Power Transfer: Application to a Drone-in-Flight Wireless Charging Platform. IEEE Transactions on Industrial Electronics 66 (2019): 4097-4107.

Assawaworrarit S, Yu X, Fan S. Robust wireless power transfer using a nonlinear parity-time-symmetric circuit. Nature. Jun. 14, 2017; 546(7658): 387-390.

\* cited by examiner

SYSTEMS AND METHODS INVOLVING WIRELESS POWER TRANSFER USING AN AMPLIFIER WITH GAIN AND FEEDBACK

FEDERALLY-SPONSORED RESEARCH AND DEVELOPMENT

This invention was made with Government support under contract N00014-17-1-3030 awarded by the Department of Defense. The Government has certain rights in the invention.

BACKGROUND

Aspects of various embodiments are directed to methods and apparatuses for wireless transfer of power.

Wireless power transfer is gaining importance in our increasingly mobile lifestyle. Stationery wireless power transfer has been commercially deployed for charging of wide varieties of devices such as mobile phones and parked electric vehicles. Despite having made inroads into real-world applications, the standard wireless power transfer setup still suffers from its inherent sensitivity to the relative movement of the device with respect to the power source. Maintaining consistent wireless power delivery to a moving device is a challenge in wireless power since the optimum operating condition of the scheme depends on the distance between transmit and receive coils.

While there have been numerous advancements in the area of power-transfer circuits to deliver robust wireless power transfer in a way that maintains high power-transfer efficiency and high transfer-power levels, such advancements have been challenged under various constraints and conditions such as when the device is rapidly moving and when the application does not permit for external tuning of the power-transfer circuitry. Moreover, some advancements in this area require use of an inefficient gain element such as a negative impedance converter, and this results in poor total system efficiency.

Some exemplary aspects/features disclosed herein are directed to addressing these and other issues.

SUMMARY OF VARIOUS ASPECTS AND EXAMPLES

Various examples/embodiments presented by the present disclosure are directed to issues such as those addressed above and others which may become apparent from the following disclosure. For example, some of these disclosed aspects are directed to methods and apparatus (e.g., systems, circuits, circuit-based chips, devices) that may be used in connection with wireless power transfer using an amplification circuit with gain and feedback.

In certain examples, these and other aspects are directed to an apparatus and/or method involving an apparatus including source circuitry configured to provide power to other circuitry, with the source circuitry including amplification circuitry and a source resonator. The amplification circuitry, which may have a power-switching output, is to provide power to the source resonator with a gain that is dependent on a coupling rate between the source circuitry and other external-receiving circuitry. The amplification circuitry is also to offset phase delay caused by the amplifier. In operation, the source resonator generates a magnetic field in response to the power, for highly-efficient wirelessly transfer of the power to the other circuitry.

In other specific examples relating to the above aspects and also according to the present disclosure, certain embodiments are directed toward the source circuitry with a gain circuit that provides power to the source resonator that is dependent on a coupling effect, rate, and/or efficacy between the source circuitry and other (external) circuitry. The other circuitry, as noted above, may or may not be external to the apparatus and may sometimes referred to as "receiver circuitry." The gain circuitry can adjust a gain in the source circuitry (e.g., the amplifier) corresponding to the power, with the gain being a function of the coupling effect, rate, and/or efficacy. The power transferred to the other circuitry can be controlled to remain within a threshold transfer efficiency across a range of transfer distances due to the gain circuitry.

In a further specific example embodiment, the above-characterized amplifier (of the source circuitry) is implemented as a switch-mode amplifier so as to realize 100% power efficiency with satisfaction of a certain efficient switching condition.

In yet further specific examples according to the present disclosure, one or more of the above embodiments is implemented to realize robust wireless power transfer over a wide range of transfer distances. In another such specific example embodiment, such robust wireless power transfer involves use of a switch-mode power type of design in a nonlinear parity-time-symmetric circuitry. This type of design, as demonstrated in various experiments, have realized such high efficiency (i.e., at least 90% total) and levels of robustness against distance variation over wide ranges (e.g., 70 cm of over 90% efficiency).

Various other specific embodiments are directed to methods and apparatuses that include one or more of the above aspects and further including a source resonator that is to adjust an operating frequency of the generated magnetic field which is used to transfer power to the other circuitry, and this power transfer may be based on a nonlinear gain provided by the gain circuitry. The adjusted operating frequency can allow for the power transferred to the other circuitry to be within a threshold power over a range of distances separating the source circuitry and the other circuitry.

In various other specific embodiments also consistent with the present disclosure and in connection with the above examples of source circuitry, such source circuitry may be configured to include a plurality of source circuits (e.g., similarly-situated sets of source resonators and gain circuitry) located at different locations. Via operation thereof at the different locations, an apparatus may provide power to such other circuitry. In one such example wherein the other circuitry includes a receiver resonator and load circuitry, the receiver resonator wirelessly receives the magnetic field and powers the load circuitry using the received magnetic field at the operating frequency.

The above discussion is not intended to describe each aspect, feature or example embodiment of the present disclosure. The figures and/or more detailed discussion that follow are to provide an understanding of the present disclosure by way of non-limiting various example embodiments.

BRIEF DESCRIPTION OF FIGURES

Various example embodiments may be more completely understood in consideration of the following detailed description in connection with the accompanying drawings, each of which is briefly described below.

Each of FIGS. 2A-2D illustrates an aspect of circuit operation in accordance with exemplary circuitry of the present disclosure, wherein.

Figure 1A:
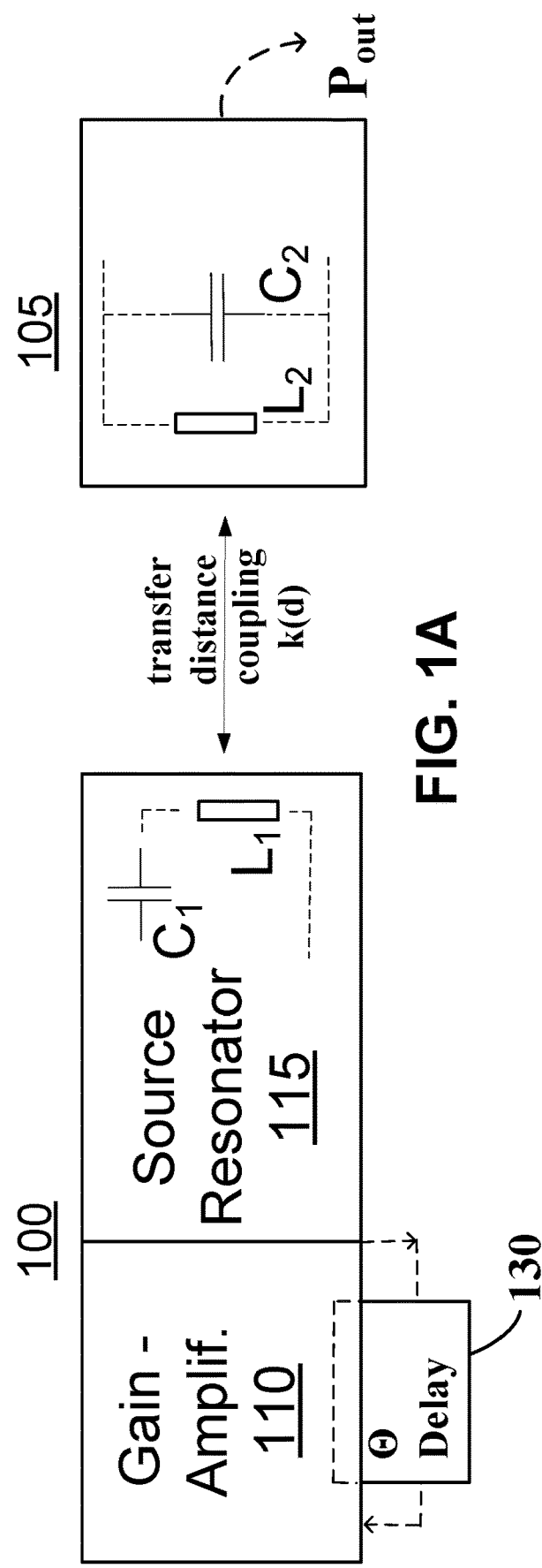
FIG. 1A is a circuit diagram of an example apparatus for wireless power transfer, in accordance with embodiments of the present disclosure.

While various embodiments discussed herein are amenable to modifications and alternative forms, aspects thereof have been shown by way of example in the drawings and will be described in detail. It should be understood, however, that discussion of such examples, or example embodiments, are for descriptive/illustrative purposes as opposed to effecting limitations on the disclosure.

DETAILED DESCRIPTION

Exemplary aspects of the present disclosure are believed to be applicable to a variety of different types of apparatuses, systems and methods involving efficient wireless transfer of power using source circuitry, including an efficiently-operative amplifier, to provide power to other circuitry. Such an amplifier may be used in gain circuitry for providing power to a source resonator via a gain that is dependent on a coupling rate between the source circuitry and the other circuitry. While the present disclosure is believed to be applicable to a variety of different types of apparatuses, systems and methods involving such an amplifier, the disclosure is not necessarily limited to such specific aspects. An understanding of specific examples from the following description may be appreciated for an understanding thereof.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same connotation and/or reference numerals may be used in different diagrams to refer to the same elements or additional instances of the same element. Also, although aspects and/or features may in some cases be described in individual figures, it will be appreciated that aspects and/or features from one figure or embodiment can be combined with aspects and/or features of another figure or embodiment even though the combination is not explicitly shown or explicitly described as a combination, and such combinations include any one of a combination of examples, aspects, applications and features as disclosed in U.S. Provisional Patent Application No. 62/925,696 (Docket STFD.415P1, filed Oct. 24, 2019).

For certain example applications involving devices which may be moving rapidly, certain exemplary aspects of the present disclosure are directed to circuitry that effects robust wireless power transfer while maintaining both the power transfer efficiency and transfer power level even as the device is rapidly moving and without the need for external tuning. In such examples and without necessarily using inefficient gain element(s) based on a negative impedance converter, poor total system efficiency is avoided and rather, robust and highly efficient wireless power transfer is provided at scalable power levels by using a power-efficient power-switching amplifier. In more particular embodiments, current-sensing feedback to the power-switching amplifier is used to address or mitigate phase offset caused by the amplifier.

A related specific example embodiment, consistent with the present disclosure, is illustrated in FIG. 1A which is a circuit diagram of an example apparatus for wireless power transfer from source circuitry 100 to other circuitry 105. As depicted, the other circuitry 105 may be external to the apparatus as in a separately-manufactured device that can receive power wirelessly from the source circuitry 100, or may be part of the same apparatus such as in a system or set of related devices. In either case, the source circuitry 100 includes amplification-gain circuitry 110 (or amplifier 110) and a source resonator 115, with the amplifier 110 being configured to provide a gain (e.g., controllable, fixed, variable, dynamically set) for delivering power to the source resonator with the gain being dependent on a coupling rate between the source circuitry and other circuitry 105. The source circuitry 100 may also include circuitry, such as a phase delay circuit 130, configured to offset a phase delay, caused by the amplifier 100, and in operation, the source resonator 115 generates a magnetic field in response to the power, for highly-efficient wirelessly transfer of the power to the other circuitry 105.

In accordance with various embodiments, the amplifier 110 (sometime also gain circuitry) may include a switch-mode type amplifier (e.g., with a field-effect transistor, not shown) and the phase delay circuitry 130 may be current-sending phased-delay feedback circuitry. The gain circuitry can provide power (energy) to the source resonator 105 with a gain that is dependent on a coupling rate between the source circuitry and other circuitry. The switch-mode amplifier can provide a negative resistance. In operation, the switch-mode amplifier can provide a phase delay. The feedback circuitry can offset the phase delay caused by the switch-mode amplifier. In specific embodiments, the feedback circuitry includes an inductor (e.g., Lf) and resistor (e.g., Rf) configured and arranged in parallel and that offset the phase delay. Other specific embodiments implement such phase delay circuitry 130 in any of a number of circuits; non-limiting examples include those configured for operable digital and/or analog signal operation such as filters, amplifiers and/or individual components that present a delay in a signal's phase based on how such structure affects the signal in time/phase as the signal passes from input to output (e.g., via the feedback passing from the right to the left of circuit 130).

In specific embodiments wherein the amplifier includes a switch-mode amplifier, the switch-mode amplifier may be or include a class-E amplifier for effecting highly-power efficient operation. Amplifier inefficiency sometimes arises from having high levels of voltage and current flowing into the amplifier's transistor at the same time. The efficiency of the amplifier has a direct effect of reducing unwanted power loss, and it increases the maximum power level that the circuit can handle. By operating the transistor as an on-off switch, high-current and high-voltage durations are spread out in time resulting in little or no power loss. In certain of these specific embodiments, a class of switch-mode amplifiers known as class-E (in theory able to achieve 100% maximum efficiency) are used to optimize such high power efficient operation in the source circuitry 100.

Robust wireless power transfer may be achieved using the system of FIG. 1 with a PT-symmetric scheme, for example, and may have total system efficiency of over 90%, for example, in a strong coupling region. The efficiency may be limited by intrinsic losses of transmit and receive coils.

FIG. 1A also depicts more specific examples, one of which includes each of the source resonator 115 and the other power-receiving circuitry 105 having circuitry and/or components (e.g., RLC or LC) so that a certain tuned degree of resonance may be realized and/or maintained between the source resonator 115 and the other power-receiving circuitry 105. In this regard, the source resonator 115 is shown to include such RLC or LC components via a capacitive circuit or capacitor $C_{1'}$ and an inductive circuit or inductor $L_1$. Similarly, the other circuitry 105 is shown to include such resonance-capable circuitry as a capacitive circuit or capacitor $C_2$ and an inductive circuit or inductor $L_2$. In other more-specific examples, the source resonator 115 is used to provide a feedback signal to help control an offset which may be caused by the amplifier 110. As may be applicable to each such example, to the right of the other (lossy) circuitry 105, an arrow is shown to depict power (as derived from the wirelessly-transferred power) being consumed by a load which may be within the other circuitry 105 and/or coupled thereto.

In certain implementations and/or specific uses of exemplary devices constructed in accordance with the present disclosure, embodiments have been shown to be beneficial when used in the context of wireless power transfer when one or more of the source circuitry and receiver circuitry are moving relative to one another over time. For example, the transfer distance between circuitry used to transfer wireless power (e.g., source and receiver) can change over time, such as in the instances of powering a moving vehicle or other mobile devices. Achieving a robust wireless power transfer is useful, for example, in realizing dynamic power transfer for delivering power to moving devices or vehicles, where the (power) transfer distance and/or direction can change continuously. A robust transfer efficiency, as used herein, includes or refers to a transfer efficiency of power from source circuitry as received by receiver circuitry that remains within a threshold across a range of coupling effects, rates, and/or efficiencies. Particular example embodiments are directed to wireless transfer of power achieved by non-radiative transfer, where magnetic field coupling in the near field may be used to transfer power in an efficient manner.

Such example applications are wide ranging and include a charging station operable to transfer power to a passive or active circuit that receives the wireless power for charging a battery or power retaining circuit, and/or otherwise providing sufficient power for operating at least a portion of a circuit. Such a power-receiving circuit may or may not include a rechargeable battery, may be in a relatively small apparatus or in much larger apparatus. Accordingly, one or both of the source circuitry and the power-receiving circuit may be operable as delivering and/or receiving power over such relative movement. These apparatus may correspond to such items as: a smartphone, smartwatch, PDAs and various portable CPU-based equipment such as laptops; an electric bicycle; exercise equipment; an unoccupied vehicle device; a person-transporting vehicle; a satellite; etc.

In some specific example embodiments also consistent with the present disclosure, wireless transfer of power is achieved utilizing a technique, in which the source circuitry and the other circuitry, to which the power is to be transferred, are configured to transfer power according to parity-time symmetry (or PT-symmetry) where the amount of the gain manifested by the gain circuitry is balanced by the loss rate in the circuit. In such a PT-symmetry power transfer scheme, the source-receiver resonant coupling rate K varies as a function of transfer distance d. In FIG. 1A, for instance, such as transfer distance d is depicted as a transfer distance coupling κ(d). PT-symmetric based apparatuses can be invariant under the joint parity and time reversal operation. In optics, where the symmetry conditions can be met by engineering of gain/loss regions and their coupling, PT symmetry has garnered interest due to their unique properties. A linear PT-symmetric system supports two phases depending on the magnitude of the gain/loss relative to the coupling strength. In the unbroken or exact phase, Eigenmode frequencies remain real and energy is equally distributed between the gain and loss regions; whereas, in the broken phase, one of the Eigenmodes grows exponentially and the other decays exponentially. For further information regarding PT-symmetry and previous experiments and examples of wireless power transfer, reference may be made to Appendix D of the above-referenced U.S. Provisional Application.

In other more-specific examples, aspects and circuitry as described above may be implemented as a wireless power-transfer apparatus that utilizes PT symmetry with nonlinear gain saturation for wireless power transfer. In FIG. 1A, for example, the gain in the amplifier 100 may be saturable via feedback or other control such that the gain may be saturated nonlinearly, via nonlinear feedback and/or other control. Using such nonlinear gain saturation in a PT-symmetric system can result in a system that reaches a stationary state in a laser-like fashion that contains many PT symmetry characteristics, with the selection of the lasing frequency based on that of the PT Eigen mode and the steady-state intensities controlled by the gain saturation mechanism.

Again using FIG. 1A to exemplify various examples in accordance with the present disclosure, the power to be transferred from the source circuitry 100 to the other circuitry 105 may be associated with a resonant frequency corresponding to a resonance circuit including the source resonator 115 as a portion of the source circuitry and with an inductances, capacitances and/or impedances provided such that the impedance at a resonant frequency is independent of the values of the inductance and the capacitance while the source circuitry 100 and the other circuitry 105 are in a region of strong coupling in which the system oscillates at a frequency that automatically adapts to a change in the coupling rate. In more specific embodiments, the source circuitry 115 may be configured to adjust an operating frequency of the magnetic field, as used to couple the power wirelessly to the other circuitry 105, based on a nonlinear gain of the gain circuitry as described above.

Accordingly, in such example embodiments, a nonlinear parity-time symmetric radio-frequency circuit has been demonstrated to wirelessly transfer approximately 10 W of power with nearly constant (e.g., over 80% and in some instances as much as 92%) total efficiency robustly over a distance from 0 to 65 cm between two devices, at one of which is moving relative to the other. In such example embodiments, the present disclosure characterizes one such specific embodiment consistent with FIG. 1A corresponding to a PT-symmetric wireless power transfer scheme having a source resonator with saturable gain coupled to a lossy receiver resonator. For these and other embodiments consistent with FIG. 1A, FIG. 1B is a circuit diagram showing an equivalent circuit model of aspects of FIG. 1A.

Figure 1B:
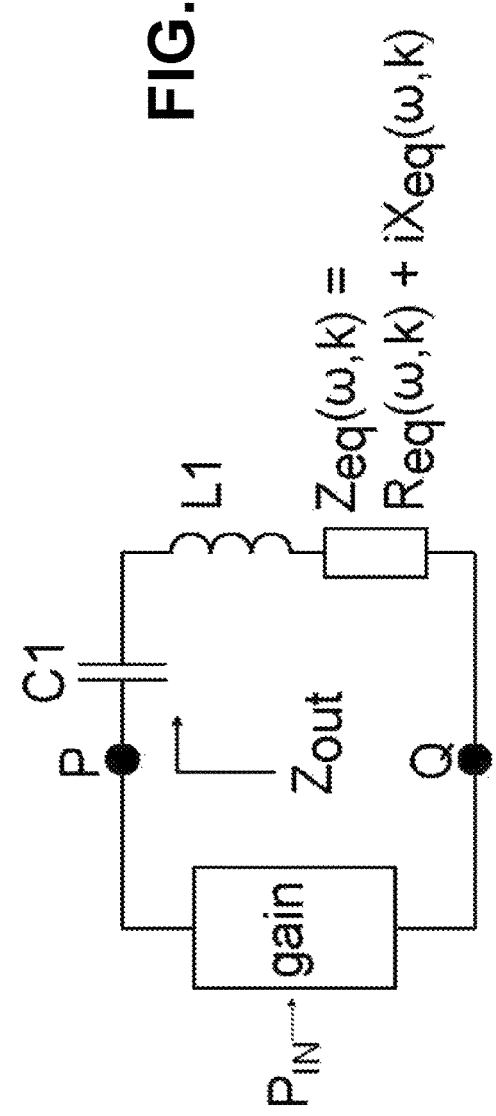
FIG. 1B is a circuit diagram showing an equivalent circuit model of aspects of FIG. 1A of an example apparatus for wireless power transfer, in accordance with embodiments of the present disclosure.

More particularly, FIG. 1B is an equivalent circuit model, in accordance with the present disclosure, representing the loading effect of the receiver side of the transfer being modeled with an equivalent impedance ($Z_{eq}(\omega, \kappa)$) that depends on the frequency and the coupling constant $\kappa$. In contrast to other wireless power transfer schemes where the power is injected into a source resonator by a radio-frequency source at a fixed frequency, in this particular example the power is injected through the gain element incorporated into the source resonator. This PT-symmetric setup automatically oscillates at a frequency that is optimal for wireless power transfer, and hence can achieve constant transfer efficiency and deliver consistent power level for a wide range of the transfer distance without any need for external tuning. For example, while a transfer efficiency value that exceeds 90% for dynamic wireless power transfer has been cited previously, approximately 10% of that value is primarily attributable to the low efficiency of the process that injects power into the system. In accordance with certain examples of the present disclosure and with elucidation of the physical mechanism that limits the efficiency of the power injection process, higher levels of system efficiency may be realized for wireless power transfer.

In accordance with the present disclosure and using example embodiments such as described above which may operate using a PT-symmetric wireless power transfer scheme, it may be appreciated that power flow starts at the gain element embedded inside the source resonator (e.g., 115 of FIG. 1A) which receives supplied power and continually injects power into the source resonator. The coupling between the two resonators provides a power transfer path from the source to the receiver where powered is delivered to the load. The time evolution of the amplitudes of the source and receiver resonators, $a=[a_s, a_r]^T$, is governed by $i(d/dt)\,a = H(|a_s|)a$ with the following nonlinear Hamiltonian as in Equation 1 below:

$$H(|a_s|) = \omega_0 \begin{bmatrix} 1 + i\dfrac{g(|a_s|)}{2} & \dfrac{k}{2} \\ \dfrac{k}{2} & 1 - i\dfrac{\gamma}{2} \end{bmatrix} \quad (1)$$

where $\omega_0$ is the resonant frequency, $\kappa$ is the coupling constant between the two resonators which varies with their separation distance, and g describes the strength of gain in the source resonator. The gain saturates as $|a_s|$ increases, $\gamma$ is the loss constant of the receiver resonator. If the unsaturated gain $g(|a_s|=0) > \gamma$, as time evolves the system settles into a stable oscillating state due to gain saturation. A solution for these steady states can be realized by finding stable oscillatory states for the dynamics described by Eq. (1). Each state is characterized by its steady-state oscillation frequency, $\omega_{ss}$, and its steady-state gain value, $g_{ss}$. These parameters exhibit different characteristics depending on whether the system is in the strong coupling region ($k \geq \gamma$) which supports two steady states or weak coupling region ($k < \gamma$) which supports only one (as in Equations 2 and 3 respectively below):

$$\omega_{ss} = \begin{cases} \omega_0, & k < \gamma \\ \omega_0\left[1 \pm \dfrac{1}{2}\sqrt{k^2 - \gamma^2}\right], & k \geq \gamma \end{cases} \quad (2)$$

and $$g_{ss} = \begin{cases} k^2/\gamma, & k < \gamma \\ \gamma, & k \geq \gamma \end{cases}. \quad (3)$$

In the strong coupling region, exemplary embodiments or systems in accordance with the present disclosure thus oscillate at a frequency that automatically adapts to the changing coupling rate. Moreover, such oscillation frequency in fact corresponds to the efficiency at which maximum transfer efficiency occurs in a standard wireless power transfer setup. Thus, in the nonlinear PT symmetric wireless power transfer scheme, the transfer efficiency and delivered power are robust to transfer distance variations without the need for any external tuning of the circuit. This is in contrast to the standard wireless power transfer scheme, which requires external tunings of the circuit to maintain high transfer efficiency as the transfer distance varies.

In a previous demonstration of PT-symmetric wireless power transfer scheme, a high transfer efficiency (defined as the efficiency of the system to transfer the power between the resonators) was achieved with optimization of the efficiency of power injection into the system and with use of a negative-impedance converter (NIC) design to provide gain to the source resonator. In such a NIC system, the source resonator uses both an amplifier and a resistor in line at the amplifier's output, and this cause significant current to flow through the resistor and, thus, a significant source of power loss at the resistor and thereby limiting the maximum efficiency to below 50% and in some instances, below 30%. Accordingly, the example apparatus of FIG. 1A may be implemented to provide for dramatic improvements over such NIC-type designs.

Figure 1C:
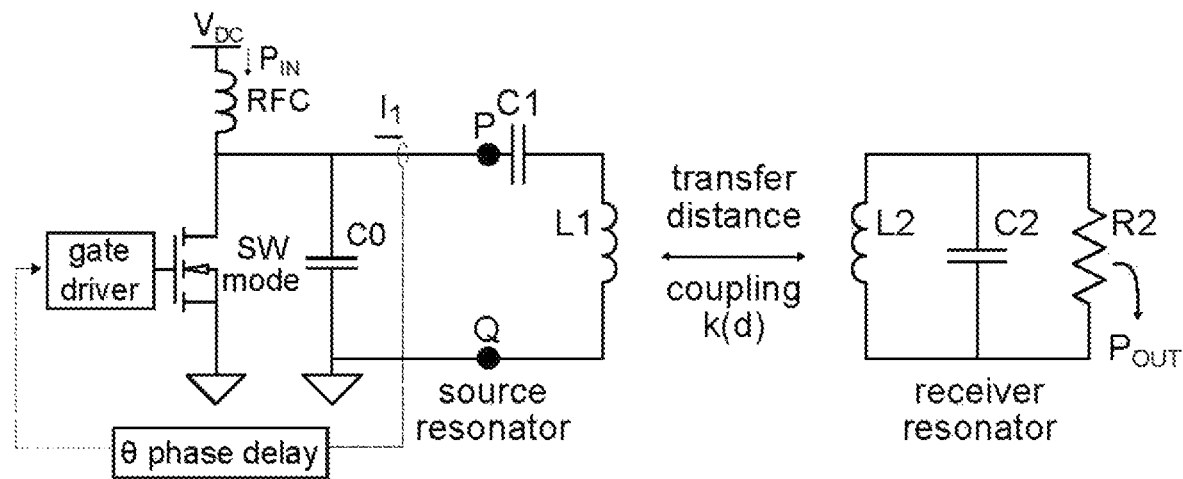
FIG. 1C is a specific circuit diagram of a wireless power-transfer system for showing one example manner in which the example apparatus of FIG. 1A may be implemented, in accordance with embodiments of the present disclosure.

FIG. 1C is a specific circuit diagram of a wireless power-transfer system for showing one example manner in which the example apparatus of FIG. 1A may be implemented, in accordance with embodiments of the present disclosure. Similar to the circuitry shown in FIG. 1A, the specific circuit diagram of FIG. 1C includes a switch-mode FET-based amplifier as corresponding to the amplifier 110 of FIG. 1A, a gate driver responding to the phase delay circuit for driving the gate of the switch-mode FET. Further, with this circuit of FIG. 1C using a current sensing phase-delay circuit in the feedback path, robust wireless power transfer may be achieved with total system efficiency of over 90% in the strong coupling region (e.g., wherein κ≥γ as discussed above).

Figure 1D:
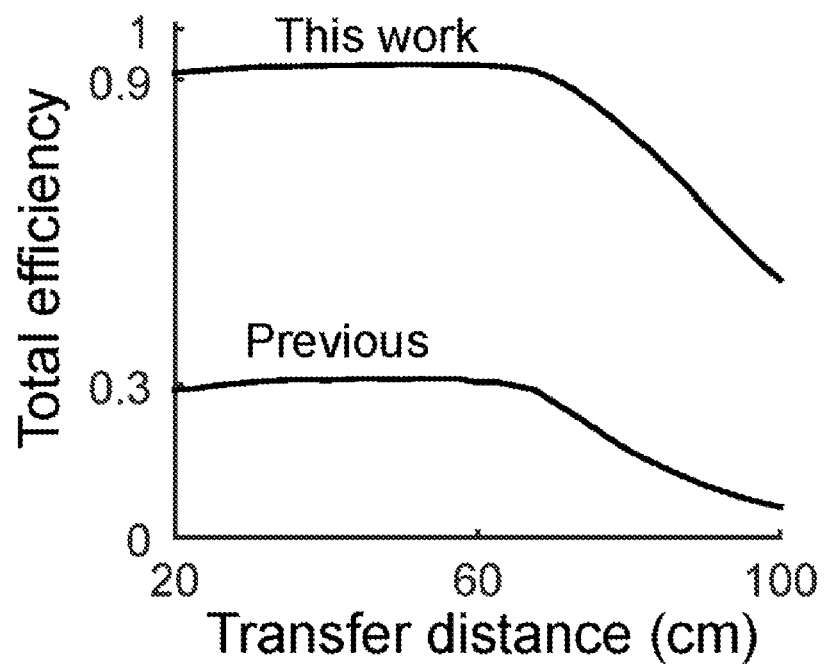
FIG. 1D is a plot showing a comparison of simulated total power efficiency values versus transfer distance in connection with a previously-known circuit and a wireless power-transfer system in accordance with the present disclosure such as exemplified in the apparatus shown in FIG. 1A and/or FIG. 1B.

FIG. 1D is a plot, or a set of two plots, showing a comparison of simulated total power efficiency values versus transfer distance in connection with the above-noted NIC-type circuit (lower of the two plots) and a wireless power-transfer system (upper of the two plots) in accordance with the present disclosure such as exemplified in the apparatus shown in FIG. 1A and/or FIG. 1B. From the comparison, results show achievement in terms of robust and efficient wireless power transfer with considerable improvement in efficiency. For example, the upper plot (labeled "this work") show total efficiency at over 90% in a strong coupling region (e.g., up to 60 cm as shown) using a switch-mode amplifier with phase feedback consistent with FIG. 1A and/or FIG. 1B.

In more specific examples, the amplifiers (such as in FIG. 1A) use FET-based transistors such as MOSFET technology as a central part of the switch-mode amplifier. Specific operating regimes of the FETs are chosen in different designs of an amplifier with important implications on the amplifier's linearity and power efficiency. MOSFET terminology for the terminal names and the operating regimes which are cut-off, ohmic, and saturation (also called active). These different regimes of operation are labelled on the transistor's current-voltage plot shown in FIG. 2A. While a linear amplifier is useful in certain example embodiments consistent with FIGS. 1A and 1n accordance with the present disclosure, the transistor is biased to operate in the saturation regime as a gate voltage controlled current source (i.e., a dependent source), where variations in input gate-to-source voltage (Vgate) produce offset and proportionally scaled variations in the transistor's drain current ($I_D$) and drain-to-source voltage ($V_{DS}$). The shaded region or curve shown in FIG. 2A ("linear amp") depicts a representative trace of $I_D$ and $V_{DS}$ over one cycle for the linear amplifier. Here the transistor spends a significant portion of a cycle with simultaneously high $I_D$ and $V_{DS}$ resulting in energy wasted through conduction loss in the transistor. The efficiency of the linear amplifier depends on the exact bias point and signal amplitude but is typically below 80%. Therefore, designs in accordance with the present disclosure which may use a linear amplifier do not realize as high efficiencies and are thus less favorable for efficiency-demanding applications.

Figure 2A:
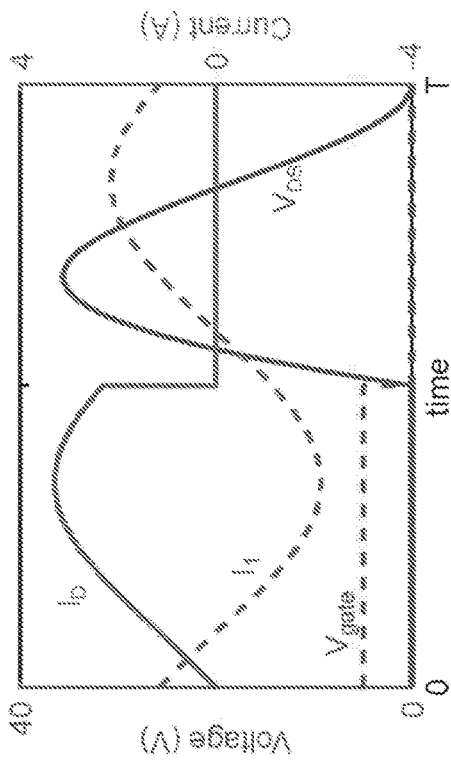
FIG. 2A shows parametric space associated with a specific circuit consistent with the example apparatus of FIG. 1A.

In other embodiments involving use of a switch-mode amplifier as discussed above, near-unity efficiency may be achieved by operating the transistor as a switch alternating between switch on and the switch off states (as shown in the plots overlaying the horizontal and vertical axes in FIG. 2A), both of which have negligible conduction loss. Specifically, a large gate-to-source voltage (e.g., 5 V or higher) sets the transistor in the ohmic regime which turns on drain-to-source conduction, corresponding to the switch-on state. A transistor specially designed to operate as a switch can have very low on resistance in order of milliohms in the ohmic regime. A low gate-to-source voltage (e.g., 0 V) sets the transistor in the cut-off regime which turns off drain-to-source conduction ($I_D$=0) corresponding to the switch-off state.

Figure 2C:
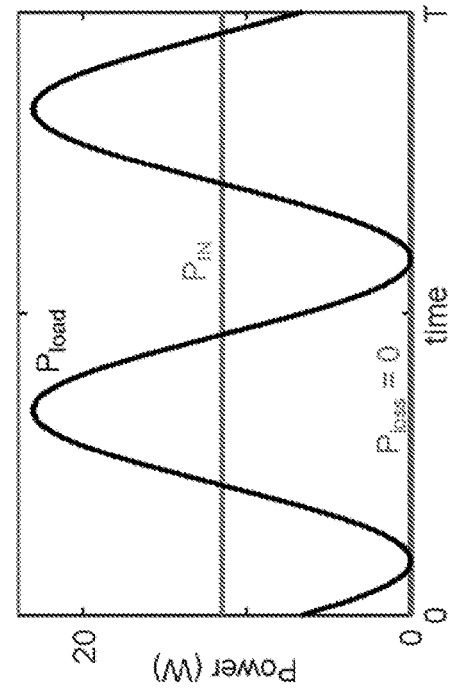
FIG. 2C a plot depicting voltage and current waveforms associated with a specific circuit consistent with the example apparatus of FIG. 1A.
Figure 2B:
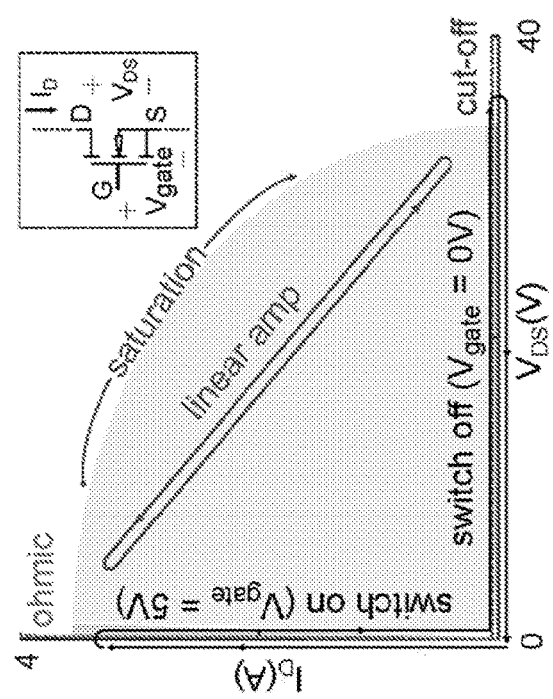
FIG. 2B shows a Class E switch-mode amplifier design as may be used in connection with the example apparatus of FIG. 1A.

FIG. 2B shows a switch-mode amplifier circuit in a class-E configuration. As shown, the gate driver generates a square-wave signal Vgate, at switching frequency f, to control the transistor to be in the on- or off-switch state. The radio-frequency choke (RFC) supplies the amplifier with constant current IDC. The output filter $L_1$ $C_1$ has small reactance $X=\omega L_1-\omega C_1$ at the switching frequency ($\omega=2\pi f$) and sufficiently high reactance at higher harmonics such that it constrains the line current $I_1$ flowing through the load R to be purely sinusoidal at w. During the switch-off time, the current difference, $I_{DC}-I_1$, goes to charge the capacitor $C_0$ leading to the voltage $V_{DS}$ to develop in time. Over the switch-on duration, $V_{DS}$=0 and the current difference flows through the transistor as drain current instead. Although, here there is a negligible amount of energy lost to conduction inside the transistor, the switch-mode operation may introduce switching loss. Suppose immediately before the switch on time, the voltage $V_{SW}=V_{DS}$ (t⁻ on) across the output capacitor is not zero. As the switch is suddenly shorted, the energy in the capacitor dissipates through the transistor, resulting in energy loss of ½ $C_0 V^2$sw per cycle. As discussed in Supplementary Information S1 in Appendix B of the above-referenced U.S. Provisional Application, the following efficient switching condition is established for 50% switch duty cycle as a relation between the switching frequency and the circuit parameters (w, $C_0$, R, X) that results in $V_{SW}$=0, and therefore no switching loss. This is expressed in Equation 4 as shown below:

$$\omega C_0 R = 0.184 \text{ and } \frac{X}{R} = 1.152 \qquad (4)$$

Figure 2D:
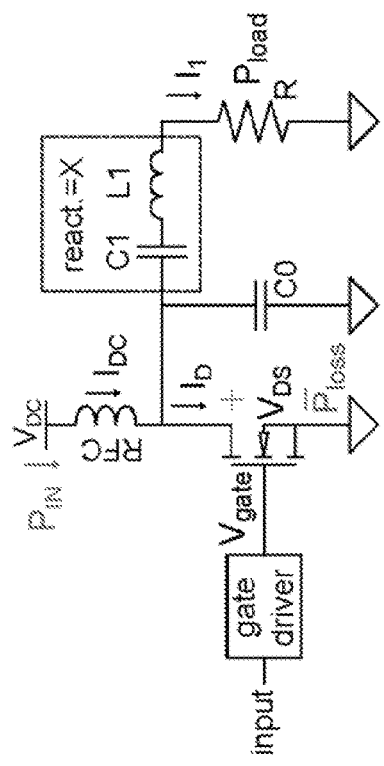
FIG. 2D is a graph with plots of waveforms depicting parameters, such as input power and power loss associated with a specific circuit consistent with the example apparatus of FIG. 1A.

FIG. 2C shows the waveforms of $I_D$, $I_1$, $V_{gate}$ and $V_{DS}$ during one on/off cycle for a circuit satisfying the efficient switching condition. The voltage $V_{DS}$ which appears across $C_0$ indeed returns to zero immediately before the transistor is switched on for the following cycle. From FIG. 2D which tracks the supplied power ($P_{in}$), transistor's power consumption ($P_{loss}$), and power consumption at load R($P_{load}$) during one cycle, it can be seen that the switch-mode amplifier is highly-efficient (e.g., above 50% or more than 90% efficiency), converting the supplied power to output power with virtually no loss.

Each of the illustrations in connection with FIGS. 2A, 2B, 2C and 2D pertain to a switch-mode amplifier as in one or more of the above-discussed examples, and in this example, $V_{DC}$=10V and R=5Ω.

Figure 3:
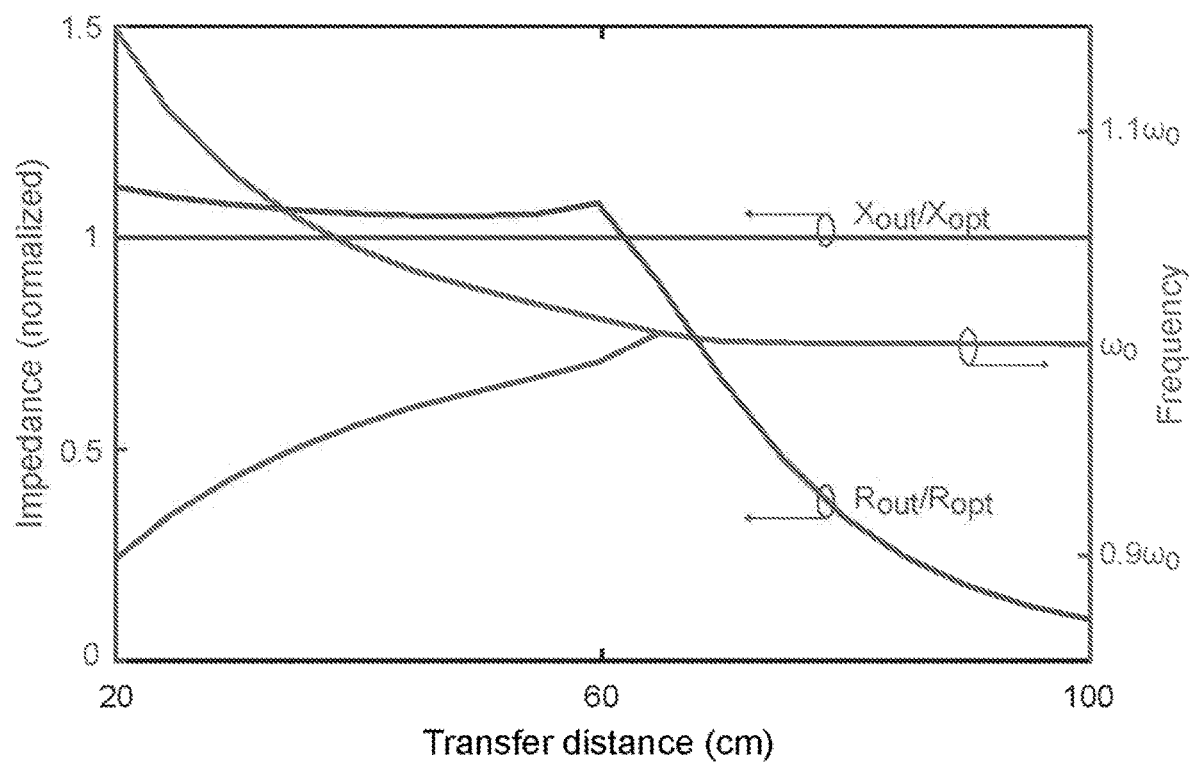
FIG. 3 is a graph with plots of waveforms depicting oscillation frequency and impedance values as seen by an amplifier output, as in the example apparatus of FIG. 1A, as a function of the transfer distance calculated at a fixed phase offset, also in accordance with the present disclosure.

Also relating to a switch-mode amplifier as in one or more of the above-discussed examples as in FIGS. 1A, 1B and/or 1C, FIG. 3 may be used to understand the switching efficiency of the amplifier, with the flat horizontal dashed-line and the solid line which is largely horizontal and sharply descending at 60 cm corresponding to the normalized impedance. The wishbone plot in FIG. 3 corresponds to frequency, with a lower branch of the plot starting at about 2.5 Ohms and an upper branch starting at about 1.5 Ohms. The switching efficiency is a function of the real and imaginary parts of total output impedance being presented to the amplifier, $Z_{out}=R_{out}+iX_{out}$, around their respective optimal values ($R_{opt}$, $X_{opt}$ satisfying Eq. 4) as may be calculated using an appropriate model (e.g., as identified above in Supplementary Information S1). The switching efficiency decreases as $Z_{out}$ deviates away from the optimal condition of Eq. 4. However, as $Z_{out}$ move toward the optimal condition and when Eq. (4) is satisfied, the current $I_1$ flowing through $Z_{out}$ has a phase delay of 212.5 degrees relative to the switch turn-on time and can be observed from their respective waveforms in FIG. 2C.

When the switch-mode amplifier is introduced into the wireless power transfer system in FIG. 1C, the effective output impedance $Z_{out}$ that the amplifier sees has contributions from the receiver's equivalent load, i.e., $Z_{out}=\omega L_1-1/\omega C_1+Z_{eq}(\omega, \kappa)$, where $Z_{eq}(\omega, \kappa)$ models the loading effect of the receiver on the source resonator. At a fixed w, $Z_{eq}(\omega, \kappa)$ depends on the coupling constant κ. Thus, one might expect that the switch-mode amplifier may not be able to operate efficiently as the transfer distance varies. Surprisingly, however, as long as the system is in the strong coupling region, the effective output impedance $Z_{out}(\omega_{ss})$ at the steady-state oscillation frequency $\omega_{ss}$, which itself also varies as a function of the coupling constant, remains essentially independent of the coupling constant (e.g., as may be derived in details in Supplementary Information S2 also of Appendix B of the above-referenced U.S. Provisional Application). This arises because the variation of $w_{ss}$ on κ works to cancel the direct effect of κ in $Z_{out}$. The result here is in fact quite general: for a LC resonant circuit, its impedance at the resonant frequency is independent of the values of L and C. Therefore, a single choice of circuit parameters in Eq. 4 is sufficient to satisfy the efficient switching condition for the entire strong coupling region.

The appropriate switch input signal $V_{gate}$ can be self-generated without external control input by using a phase delay feedback. Taking into account the phase delay between the output current and the input signal as discussed above, we can use an opposite phase feedback delay of θ=147.5 degrees to generate the switch control signal and lock the amplifier in the efficient operating region. With this feedback in place, the effective impedance $Z_{out}$ remains close (plus or minus 10%) to its optimal value throughout the strong coupling region with the resistive part ($R_{out}$) decreasing with farther transfer distance in the weak coupling region. The amplifier operating point stays near the optimal point when the system is in the strong coupling region and moves down in direction of lowered R with decreasing K in the weak coupling region (dashed white line). Accordingly, the above analysis confirms that the potency, scalability and design-flexibility tracking with or based on such aspects as in the above-described examples for wireless power transfer and particularly in connection with use of a highly efficient parity-time symmetric wireless power transfer system employing a switch-mode amplifier as in FIG. 1A.

In yet further experimental and/or proof-of-concept examples (as in FIGS. 4a-4d of Appx. A of the above-referenced U.S. Provisional Application) and using the above analyses, a prototype is constructed consistent with the examples of FIGS. 1A and 1Ca. A pair of 58 cm diameter copper coils form the inductive coupling link for wireless power transfer. The receiver's coil is configured as a parallel RLC resonator with 2.37 MHz resonant frequency ($\omega_o/2\pi$) and measured quality factor (1/γ) of 29. The source coil ($L_1$=8.9 microH) functions as the inductive element of the switch-mode amplifier's output filter. The capacitors $C_1$=480 pF and $C_o$=2.2 nF are selected to produce efficient switching according to the example design procedures outlined above taking into consideration the stray capacitances across the amplifier output and on the circuit board. The transistor switch is a gallium-nitride FET (field-effect transistor) type with very low on resistance (7 mΩ). The phase delay feedback is implemented with a small coil in a weak inductive link to the source coil and produces a phase-delayed signal of the coil current to control the timing of the transistor through a gate driver. The phase feedback also functions as a starter: a brief start signal is applied here to overcome the threshold of the gate driver and start oscillations in the source resonator. By varying the separation distance, d, between the two coils from 20 cm to 100 cm (corresponding to mutual coupling constant κ=0.253-0.011), oscillation frequency measurements may be shown to exhibit the branching characteristic of the underlying eigenfrequencies of the PT-symmetric system (as in above Eq. 2). Further, power measurements may be made at three locations: (1) power intake at the amplifier ($P_{in}$=~10 W), (2) extra power intake for the phase-delay feedback and gate driver which represents an overhead consumption ($P_{aux}$=~0.15 W) that remains relatively constant even when the amplifier supplied power is increased, and (3) delivered power at the receiver's load ($P_{out}$). Therein, the measured power transfer efficiency values may be compared with the theoretical and circuit simulation models as the transfer distance varies. The measured transfer efficiency is the total system efficiency, $\eta=P_{load}/(P_{in}+P_{aux})$. The theoretical efficiency is based on an ideal-amplifier model which only counts contributions from intrinsic losses inside the resonators and ignores losses inside the gain element. An almost flat 92% total efficiency is achieved for the transfer distance of up to 65 cm. This efficiency agrees with the prediction from the ideal-amplifier model, indicating that the switch-mode amplifier operates with almost no internal loss for a wide range of transfer distances in the strong coupling region. The total efficiency drops with larger transfer distance in the weak coupling region (d>65 cm) more than the value obtained from the ideal-amplifier model indicating that the switch-mode amplifier indeed departs from unity switching efficiency. These experimental observations agree with the theoretical analysis above. Measured input-output voltage waveforms of the switch-mode amplifier taken at various transfer distances show that for transfer distance of up to 65 cm, the amplifier output voltage ($V_{DS}$) returns to zero smoothly prior to the switch turn-on time thus resulting in a highly power-efficient switching operation. At larger transfer distance, $V_{DS}$ drops below zero and holds a small negative value (~–1V) until the start of the next cycle. When the transistor drain-to-source voltage reaches this level, the antiparallel diode turns on and automatically starts reverse conduction, which is responsible for the lowered efficiency.

Figure 4:
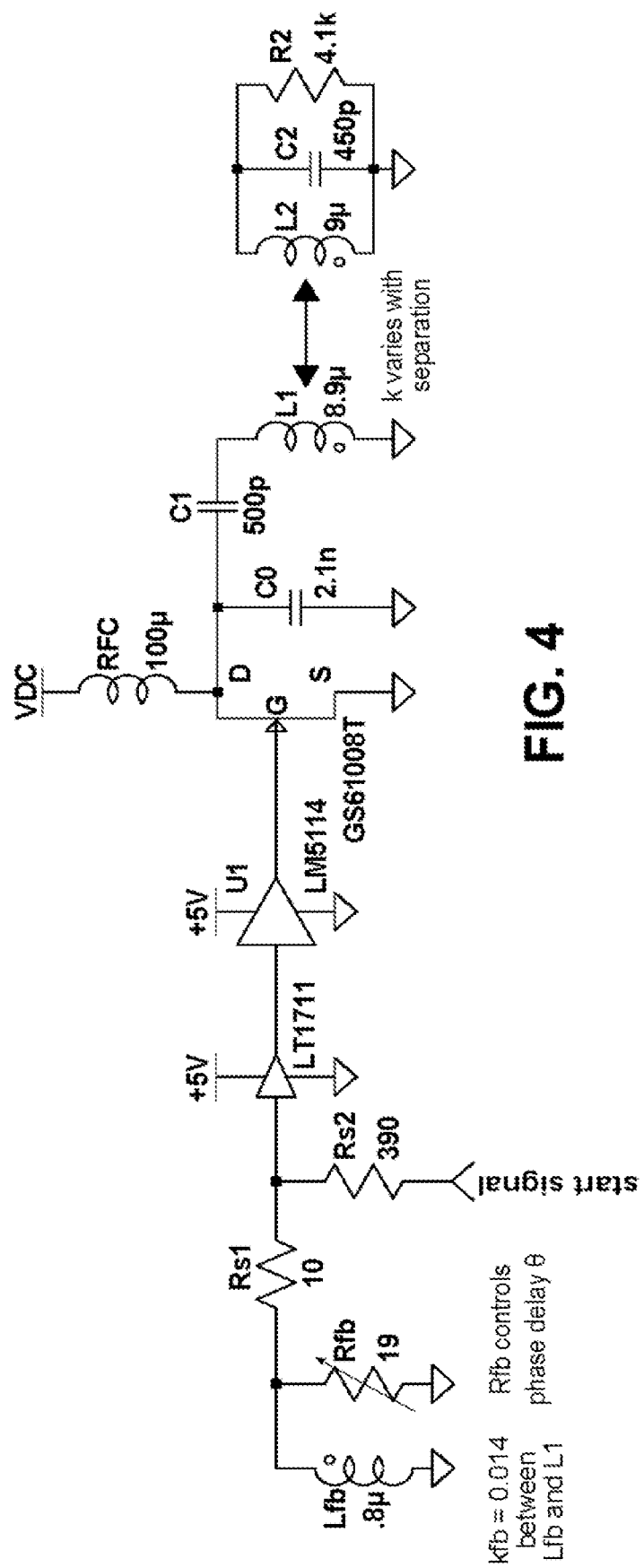
FIG. 4 is circuit diagram shown a specific example, useful for experimental purposes, of how one type of wireless power-transfer system may be implemented, in accordance with embodiments of the present disclosure.

FIG. 4 shows another more-detailed and/or experimental example consistent with FIGS. 1A, 1B and 1C. As with the prototype discussion above, in FIG. 4 phase feedback is depicted using a starter signal ("start_signal") and with a variable resistor $R_{fb}$. In this depicted circuit, the resistance provided by variable resistor Rfb (to effect the phase delay) may be controlled, for example, via a current-sense signal as discussed above and/or via other automatic/manual settings. The wireless power transfer is effected via source resonance circuitry including L1 and C1 being used to magnetically transfer power to receiver resonance circuitry including L2 and C2. The source resonance circuitry is driven by a FET (e.g., GS61D08T which is an enhancement mode GaN-on-silicon power transistor), which in turn is driven by an amplifier or gate driver such as a LM5114, available from Texas Instruments. Beneficial for this example and other examples as disclosed herein (e.g., FIGS. 1A and 1C), a properly selected amplifier or amplifier of design, such as the above LM5114, may be deemed important for realizing some of the surprising efficiency levels as discussed above where phase delay feedback is used in the providing the wireless transfer of power. In such applications, the selected amplifier may have relatively low switching losses (e.g., due to power FETs internal to the selected amplifier) and/or high levels of overall measured efficiency. For example, published specifications for the LM5114 characterize its measured efficiency rated at 97% @ at 48 V 2 A, in part due to the design of its internal power FETs). It is appreciated that for various specific embodiments in accordance with present disclosure, another amplifier with another overall measured efficiency rating (or equivalent ratings) may be selected for use to realize acceptable levels and related parameters associated with the desired power transfer efficiency. In various non-limiting specific embodiments, respective examples of such measured efficiency ratings for particularly selected amplifiers are: at least 65%, at least 75%, at least 85% and at least 90%. According to more specific example embodiments, the overall measured efficiency of the selected amplifier or design of the amplifier is related (in the same direction) to the efficiency of the power transfer via the wireless coupling to the other circuitry. For example, the wireless power transfer may have an efficiency that is defined as a function of said overall efficiency of the selected amplifier, whereby a greater wireless power transfer may be realized by selecting the amplifier having a greater overall efficiency.

In various alternative embodiments, such a gate driver may be used to drive multiple FETs in parallel, with each FET situated in parallel to drive one or multiple source resonance circuits, which in turn may be used (individually and/or in combination) to magnetically transfer power to one or more receiver resonance circuits, similar to that shown in FIG. 4. The LM5114 driver is one of many drivers which may be used for this purpose as, advantageously, it has strong sink current capability and is able to drive multiple FETs in parallel. In various examples of this type, depending on the application, the phase feedback (e.g., at $R_{fb}$ of FIG. 4) may be: combined/averaged from another circuit (e.g., an adder to add each current-sense circuit for an increased current feedback level to addressed by a such a feedback control resistor); or operated based on current feedback from a selected one of the multiple source resonance circuits which selected one may be fixed and or variably selected such as through a multiplexer with a variable/rotating selector input port.

In yet further embodiments according to the present disclosure, a system may use such circuits, for example as in FIG. 1A, FIG. 1C, FIG. 4, etc., in parallel for providing an increase (combined) level of wireless power transfer to the same resonance circuit and/or to multiple receive resonance circuits. In the latter case, the multiple receive resonance circuits may be similarly constructed (e.g., with parameters defining the same or similar resonance frequency and load/power-drain specifications) or constructed differently with regards to such parameters.

Accordingly, this experimentation demonstrates the ability to transfer power up to 8 W with the above-noted efficiencies. This is to be compared with the previous efforts which, based on parity-time symmetric wireless power transfer scheme, the transferred power is at the milliwatt level.

Based on the above other example embodiments, consistent with the present disclosure and as characterized by such circuit-based systems as in FIGS. 1A, 1B and 1C, are directed to further up-scaled power transfer levels. Certain examples of this type effect such wireless power transfer at levels of one kilowatt and multiple kilowatts as permissible by transistors that can handle switching power over kilowatts available, for example, with such systems as in FIGS. 1A, 1B and 1C, such wireless power transfer circuit may realize near-unity total power transfer efficiency.

In the above discussion, terms to exemplify orientation, such as rotation, angle, distance, and transfer distance may be used herein to refer to relative positions of elements as shown in the figures (e.g., position of the source resonator relative to the receiver resonator). It should be understood that the terminology is used for notational convenience only and that in actual use the disclosed structures may be oriented different from the orientation shown in the figures. Thus, the terms should not be construed in a limiting manner.

The skilled artisan would also recognize various terminology as used in the present disclosure by way of their plain meaning. As examples, the Specification may describe and/or illustrates aspects useful for implementing the examples by way of various semiconductor materials/circuits which may be illustrated as or using terms such as layers, blocks, modules, device, system, unit, controller, and/or other circuit-type depictions. Also, in connection with such descriptions, the term "source" may refer to source and/or drain interchangeably in the case of a transistor structure. Such semiconductor and/or semiconductive materials (including portions of semiconductor structure) and circuit elements and/or related circuitry may be used together with other elements to exemplify how certain examples may be carried out in the form or structures, steps, functions, operations, activities, etc. It would also be appreciated that terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. In a system using source circuitry to provide power to other circuitry, a method comprising:

providing energy from gain circuitry to a source resonator via a gain that is dependent on a coupling rate between the source circuitry and the other circuitry, the gain circuitry including an amplifier, and the source resonator including an inductance, a capacitance and an impedance and being associated with a resonant frequency;

while the source resonator is coupled to the gain circuitry, and the source circuitry and the other circuitry are in a region of strong coupling in which the system oscillates at a frequency that automatically adapts to a change in the coupling rate, using the source resonator to generate a magnetic field, for wireless transfer of the power to the other circuitry, in response to operation of the gain circuitry, wherein the impedance, at the resonant frequency, is independent of the values of the inductance and the capacitance; and offsetting phase delay caused by the amplifier.

2. The method of claim 1, wherein the amplifier generates a power-switching output with a saturable gain that is influenced by the gain circuitry, and the gain circuitry has an output impedance which remains close to an optimal value throughout the strong coupling region.

3. In a system using source circuitry to provide power to other circuitry, a method comprising:
- providing power from gain circuitry to a source resonator via a gain that is dependent on a coupling rate between the source circuitry and the other circuitry, wherein the gain circuitry includes an amplifier;
- while the source resonator is coupled to the gain circuitry, using the source resonator to generate a magnetic field in response to the power, wherein the source circuitry is to wirelessly transfer the power to the other circuitry via the magnetic field; and
- offsetting phase delay caused by the amplifier, wherein the power transferred to the other circuitry is associated with a resonant frequency corresponding to a resonance circuit having an inductance, a capacitance and an impedance associated with the inductance and the capacitance, wherein the impedance at the resonant frequency is independent of the values of the inductance and the capacitance while the source circuitry and the other circuitry are in a region of strong coupling in which the system oscillates at a frequency that automatically adapts to a change in the coupling rate.

4. The method of claim 1, wherein the source circuitry is configured to adjust an operating frequency of the magnetic field based on a nonlinear gain of the gain circuitry, and wherein the gain circuitry is configured to adjust a gain corresponding to the power as a function of the coupling rate and causing a transfer efficiency from the source circuitry to the other circuitry that is within a threshold across at least one coupling rate among a plurality of coupling rates.

5. The method of claim 1, further including the other circuitry and wherein the other circuitry includes a receiver resonator coupled to load circuitry, the receiver resonator being configured to wirelessly receive the magnetic field and to power the load circuitry using the magnetic field.

6. The method of claim 1, wherein the source circuitry and the other circuitry are configured to transfer power from the source circuitry to the other circuitry based on a wireless power technique that uses parity-time (PT)-symmetry.

7. An apparatus comprising: source circuitry configured to provide power to other circuitry, the source circuitry including
- gain circuitry, having an output impedance, configured to provide energy to a source resonator with a gain that is dependent on a coupling rate between the source circuitry and other circuitry; and
- the source resonator, coupled to the gain circuitry, to generate a magnetic field in response to the power, wherein the source circuitry is to wirelessly transfer the power to the other circuitry via the magnetic field,
- wherein the gain circuitry includes an amplifier and a phase delay circuit to offset phase delay caused by the amplifier, and the power is associated with a resonant frequency corresponding to a resonance circuit including at least a portion of the source circuitry and having an inductance, a capacitance and an impedance associated with the inductance and the capacitance, wherein the impedance at the resonant frequency is independent of the values of the inductance and the capacitance while the source circuitry and the other circuitry are in a region of strong coupling in which the apparatus manifests an oscillation frequency that automatically adapts to a change in the coupling rate.

8. The apparatus of claim 7, wherein the source circuitry includes a source resonator configured to wirelessly transfer the power from the source circuitry to the other circuitry at a transfer efficiency that is within a threshold across a variety of coupling rates between the source circuitry and the other circuitry.

9. The apparatus of claim 7, wherein the gain circuitry further includes feedback circuitry, providing an inductance and a resistance in parallel, to facilitate said offsetting the phase delay caused by the amplifier.

10. The apparatus of claim 7, wherein the power transferred to the other circuitry is within a threshold power over a range of distances separating the source circuitry and the other circuitry.

11. The apparatus of claim 7, wherein the gain circuitry is configured to adjust a gain, corresponding to the power as a function of the coupling rate and of the resonant frequency, and to provide a transfer efficiency from the source circuitry to the other circuitry that is associated with the resonant frequency and is within a threshold across a range of coupling rates.

12. The apparatus of claim 7, wherein the source circuitry is configured to adjust an operating frequency of the magnetic field based on a nonlinear gain of the gain circuitry.

13. The apparatus of claim 7, further including the other circuitry that has a receiver resonator coupled to load circuitry, the receiver resonator being configured to wirelessly receive the magnetic field and to power the load circuitry using the magnetic field.

14. An apparatus comprising:
- source circuitry including:
  - gain circuitry to provide power to the source circuitry, the power being dependent on a coupling rate between the source circuitry and other circuitry wherein the gain circuitry includes an amplifier and a phase delay circuit to offset phase delay caused by the amplifier;
  - a source resonator configured with the gain circuity to generate a magnetic field at a frequency in response to being energized, wherein the source circuitry is configured to wirelessly transfer power to the other circuitry via the magnetic field; and
- the other circuitry, including a receiver resonator, to receive the magnetic field at the frequency, wherein the source circuitry and the other circuitry are to provide a resonance circuit associated with a resonant frequency during operation of the apparatus when the power is being transferred to the other circuitry, wherein the resonance circuit includes an inductance, a capacitance and an impedance that is associated with the inductance and the capacitance, and wherein the impedance at the resonant frequency is independent of the values of the inductance and the capacitance while the source circuitry and the other circuitry are in a region of strong coupling in which the apparatus oscillates at a frequency that automatically adapts to a change in the coupling rate.

15. The apparatus of claim 14, wherein the gain circuitry includes feedback circuitry, and the gain circuitry is configured to provide a nonlinear gain that is dependent on the coupling rate between the source circuitry and the other circuitry, wherein the coupling rate is based at least partly on a signal to be generated by the feedback circuitry.

16. The apparatus of claim 14, wherein the source resonator is configured to generate the magnetic field at a frequency that is optimal for wireless power transfer at the coupling rate.

17. The apparatus of claim 14, wherein the amplifier is in parallel with a resistor, the amplifier and the resistor being configured to provide a negative resistance.

18. The apparatus of claim 14, wherein the amplifier is configured to provide a negative resistance.

19. The apparatus of claim 14, wherein the source circuitry and the other circuitry are configured to transfer power from the source circuitry to the other circuitry using a parity-time (PT)-symmetry based wireless power technique.

20. The apparatus of claim 14, wherein the source circuitry is configured to wirelessly transfer power to the other circuitry within a threshold power across a distance between the source circuitry and the other circuitry of between 0.1 meter to 1.0 meter.

21. The apparatus of claim 14, wherein the source circuitry is configured to reach a steady state at a rate of between 0.1 millisecond to 3 milliseconds as a distance between the source circuitry and the other circuitry changes from 20 centimeters to 1 meter.

22. The apparatus of claim 14, wherein:
the source circuitry includes a plurality of source circuits located at different locations,
each of the plurality of source circuits is configured to wirelessly transfer power to the other circuitry, and
the other circuitry is configured to receive the magnetic field from a certain one of the plurality of source circuits that is situated closest to the other circuitry.

23. The apparatus of claim 7, wherein the gain circuitry is to operate by cancelling a direct effect of a coupling constant ($\kappa$), associated with the coupling rate between the source circuitry and other circuitry, on the output impedance.

24. The apparatus of claim 7, wherein the output impedance, at a steady-state oscillation frequency while the apparatus is in a strong coupling region associated with the transfer of the power to the other circuitry, varies as a function of a coupling constant.

* * * * *